US007487255B2

(12) United States Patent
Roeder et al.

(10) Patent No.: US 7,487,255 B2
(45) Date of Patent: Feb. 3, 2009

(54) ROUTING CACHE MANAGEMENT WITH ROUTE FRAGMENTATION

(75) Inventors: Michael T. Roeder, Roseville, CA (US); John W. Flick, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 957 days.

(21) Appl. No.: 10/641,217

(22) Filed: Aug. 14, 2003

(65) Prior Publication Data

US 2005/0038907 A1 Feb. 17, 2005

(51) Int. Cl.
*G06F 15/173* (2006.01)
(52) U.S. Cl. .................................. 709/238; 709/242
(58) Field of Classification Search ......... 370/237–238.1, 370/252, 255, 395.31, 395.32, 400, 428, 370/429; 709/238–244; 711/221, 216
See application file for complete search history.

(56) References Cited

U.S. PATENT DOCUMENTS

| | | | |
|---|---|---|---|
| 6,067,574 A | 5/2000 | Tzeng | |
| 6,104,701 A * | 8/2000 | Avargues et al. | 370/238 |
| 6,192,051 B1 * | 2/2001 | Lipman et al. | 370/389 |
| 6,195,356 B1 * | 2/2001 | Anello et al. | 370/398 |
| 6,223,172 B1 | 4/2001 | Hunter et al. | |
| 6,266,706 B1 * | 7/2001 | Brodnik et al. | 709/242 |
| 6,385,649 B1 * | 5/2002 | Draves et al. | 709/224 |
| 6,400,681 B1 * | 6/2002 | Bertin et al. | 370/218 |
| 6,553,031 B1 | 4/2003 | Nakamura et al. | |
| 6,590,867 B1 * | 7/2003 | Ash et al. | 370/236 |
| 6,836,462 B1 * | 12/2004 | Albert et al. | 370/235 |
| 6,876,653 B2 * | 4/2005 | Ambe et al. | 370/389 |
| 6,956,867 B1 * | 10/2005 | Suga | 370/465 |
| 6,961,310 B2 * | 11/2005 | Cain | 370/238 |
| 6,987,735 B2 * | 1/2006 | Basso et al. | 370/238 |
| 7,016,306 B2 * | 3/2006 | Alapuranen et al. | 370/238 |
| 2002/0085554 A1 * | 7/2002 | Park | 370/389 |
| 2002/0176363 A1 * | 11/2002 | Durinovic-Johri et al. | 370/237 |
| 2003/0039249 A1 * | 2/2003 | Basso et al. | 370/394 |
| 2003/0112809 A1 * | 6/2003 | Bharali et al. | 370/400 |
| 2004/0210671 A1 * | 10/2004 | Beadle et al. | 709/239 |
| 2005/0144553 A1 * | 6/2005 | Bass et al. | 715/500 |

* cited by examiner

*Primary Examiner*—Bunjob Jaroenchonwanit
*Assistant Examiner*—Tauqir Hussain

(57) ABSTRACT

One embodiment disclosed relates to an apparatus for routing packets towards destination addresses. The apparatus includes at least a routing table and a route fragment cache. Each route in the routing table includes a network address, a mask, and a corresponding forwarding information. Each route fragment in the route fragment cache includes a section of a route from the routing table. The route fragments are such that no route fragment in the route fragment cache intersects any route in the routing table that is more specific than the route from which that fragment was generated.

11 Claims, 4 Drawing Sheets

ROUTING CACHE MANAGEMENT WITH ROUTE FRAGMENTATION

BACKGROUND OF THE INVENTION

1. Field of the Invention

The present invention relates generally to networking and communications.

2. Description of the Background Art

Computer networks are widely used to provide increased computing power, sharing of resources and communication between users. Networks may include a number of computer devices within a room, building or site that are connected by a high-speed local data link such as Ethernet, token ring, or the like. Local area networks (LANs) in different locations may be interconnected to form a wide area network (WAN).

The Internet is an interconnected set of networks, wherein each of the constituent networks retains its identity, and special mechanisms are needed for communication across multiple networks. The constituent networks are referred to as subnetworks.

Each subnetwork in the Internet supports communication among the devices connected to that subnetwork. Further, subnetworks are connected by devices referred to as inter-working units (IWUs). A particular IWU is a router, which is used to connect two networks that may or may not be similar. The router employs internet protocol (IP) to allow communication between hosts and routers through the routers present in the internet protocol network. IP provides a connectionless or datagram service between stations.

Routers are specialized computing devices that route digital packets between subnets across the internet or within an intranet. Routers receive packets from one location (e.g., source computer or another router) and forward them to the next destination (e.g., destination computer or another router) over the most efficient available path.

Routers generally use routing tables to direct packet traffic over a network. Routing tables have multiple entries, or routes, each route routes to a single subnet. A subnet is identified by it's network address and it's width or network mask. Each route specifies forwarding information for the set of hosts that fall within that route's subnet. Each subnet may be further divided into smaller subnets. These subnets may be routed to using routes specific to the subdivided subnets, or there may be just one route that is used to route to a set of subnets contained within a larger subnet. Each subnet can be uniquely identified by the network part of it's network address and it's network mask.

Contiguous network routes are routes such that the mask of the subnet for the route must (when represented in binary) consist of a contiguous string of '1's followed by a contiguous string of '0's. The total number of bits for IPv4 will be less than 32.

Routes may be described using a notation [D,W], where D represents the network address and W represents the width which is the number of ones in the route's contiguous mask. For purposes of discussion, it may be assumed that a particular pair of values [D,W] uniquely identifies a route. However this is not a requirement for internet routers, nor is it a requirement for this invention. There may be multiple routes in the routing information base, RIB, that share a particular pair of values [D,W].

Two routes R1=[D1,W1] and R2=[D2,W2] are defined to be equivalent if (W1==W2)&&((D1 & WIDTH_TO_MASK (W1))==(D2 & WIDTH_TO_MASK(W2)). A route R3 is defined to be a subset of a route R4 if (W3>W4)&&((D3 & WIDTH_TO_MASK(D4))==(D4 & WIDTH_TO_MASK (D4)). If a route R2 is a subset of a route R1 then it may be said that R1 contains route R2. WIDTH_TO_MASK(W) is a function that translates a number, W, from 0 to 32 into a network mask with W 1's. Here, we define the operators '&&'=logical and, '&'=bitwise and, '=='=equality, '>'=greater than.

For instance, in the Internet context, each entry consists of the 32-bit network (Internet Protocol) address such as "192.56.7.48" and a width, or prefix length, such as 8, 16, or 24 (these are not exclusive, the width may be any number from 0 to the number of bits in the address.) The width specifies how many bits a router should consider when comparing a destination to a route for the purpose of determining if that IP address falls within (or "matches" or "is contained by") the route. For instance, if the route has a network address of "192.56.7.48" and a width of "16", the router need only consider the first two bytes to determine if a particular IP address matches the route (in other words, falls within the subnet specified for the route) and may effectively read the network address as "192.56.0.0".

Associated with each entry in the routing table is forwarding information. In some implementations, the forwarding information may comprise a "next hop" value that indexes into a second table. The second or "next hop" table is used to map layer 3 addresses to layer 2 forwarding information of adjacent routers and hosts. For instance, the IP address "192.56.7.48/16" may have an associated next hop value of "17", meaning that the IP address and the layer 2 forwarding information for either the next hop router or for the host itself if the host is directly connected is at location 17 in the next hop table.

The router uses the routing table to select the path to use when routing a packet through the network. When a packet arrives at a router, the router first finds the route in the routing table that provides the best match to the destination address. Many routing systems use best match prefix for route selection. This rule dictates that the route that best matches the destination of a packet is the route to use for routing the packet. Using best match prefix, the route that "best" matches the packet is the route with the longest prefix and whose subnet contains the destination address. Packets are forwarded using the forwarding information associated with the route that best matches the destination address from the packet. There are many different high-speed algorithms to quickly look up addresses in the routing tables.

Due to the explosive growth of content being made available on the World Wide Web, the Internet is rapidly growing to fill every corner of the world. The demands of the Internet backbone routers are commensurately increasing. Nodes are being added to the network at an extremely fast rate. It is estimated that the number of routes in the Internet backbone has been growing by 10,000 routes per year. More sophisticated and faster routers are being developed, with larger routing tables, to accommodate the increasing number of routes.

Since IP routing lookups have been inherently slow and complex, operations with prior art solutions have led to a proliferation of techniques to optimize them, one method has been to avoid performing route lookups when possible. For example, current IP router designs may use caching techniques wherein each entry in the cache corresponds to a single recently used destination address, along with the associated forwarding information that should be used to forward traffic to that destination. The technique relies on there being enough temporal locality in the traffic so that the cache hit rate is sufficiently high and the cost of a routing lookup is amortized over several packets. These caching methods may have worked somewhat well in the past. However, as the current rapid growth of the Internet increases the required size and the computation overhead of programming hardware caches of this nature may become uneconomical.

It is highly desirable to improve technology for networking and communications. In particular, it is desirable to improve routers and network routing caches.

SUMMARY

One embodiment of the invention pertains to an apparatus for routing packets towards destination addresses. The apparatus includes at least a routing table and a route fragment cache. Each route in the routing table includes a network address, a mask, and corresponding forwarding information to use for forwarding a packet. Each route fragment in the route fragment cache includes a subset of a route from the routing table along with the corresponding forwarding information. The route fragments are such that no route fragment in the route fragment cache intersects any route in the routing table that is more specific than the route from which that fragment was generated.

Another embodiment of the invention pertains to a method of generating an optimal fragment from a route, such that the route fragment includes a particular destination address. The method comprises determination of a section of the route that does not intersect any more specific route in a routing table.

DETAILED DESCRIPTION

Figure 1:
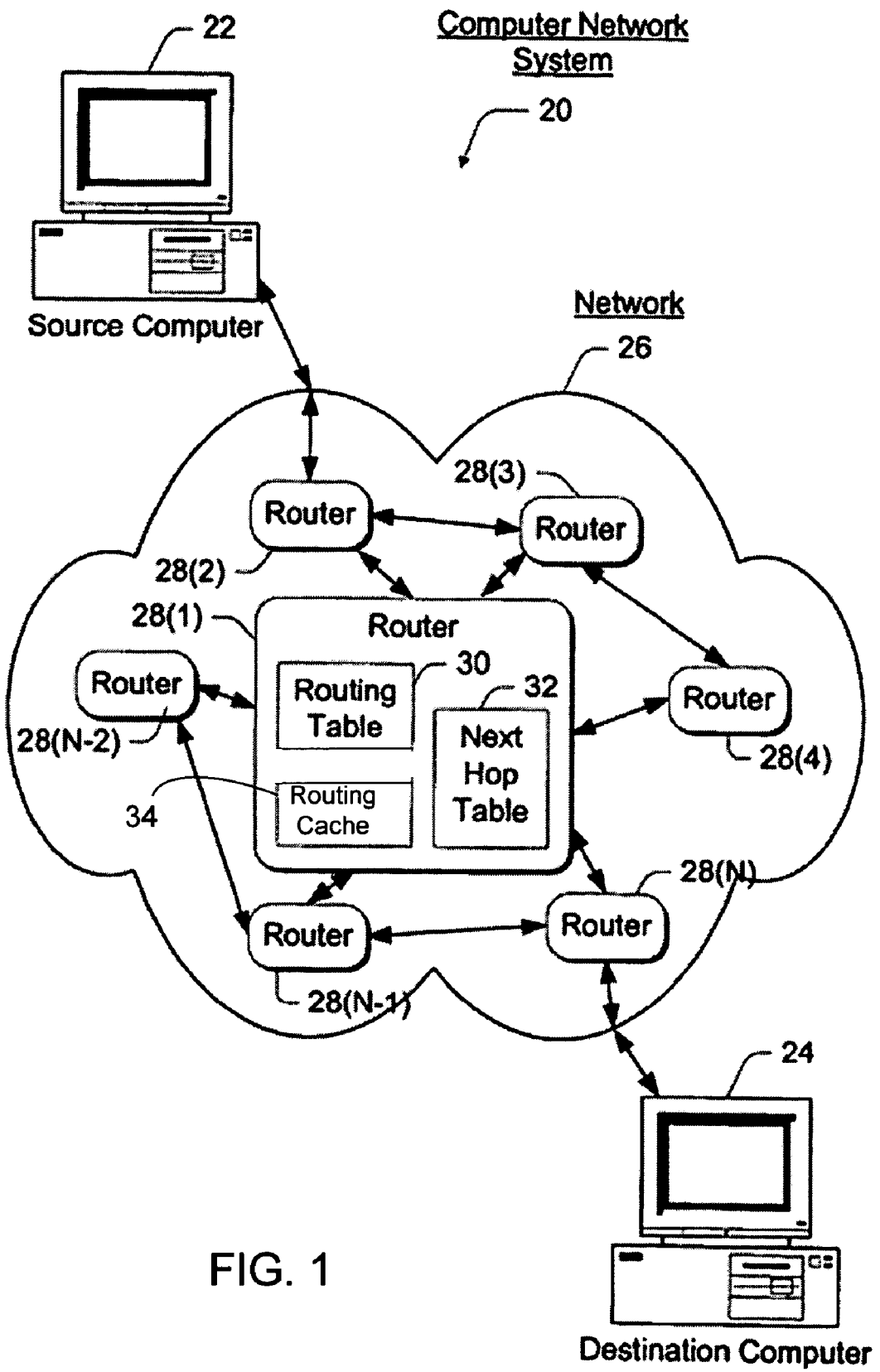
FIG. 1 is a schematic diagram depicting an example computer network system.

FIG. 1 is a schematic diagram depicting an example computer network. The computer network 20 has a source computer 22 and a destination computer 24 connected via a network 26. The network 26 comprises multiple interconnected routers 28(1), 28(2), . . . , 28(N). Packets originating from the source computer 22 are routed over the network 26, on a path selected by the routers it passes through on its way to the destination computer 24. For purposes of continuing discussion, the system is described in the context of the Internet in which packets are IP (Internet Protocol) packets that contain IP addresses of the source and destination computers.

Each router 28 maintains a large best match prefix (BMP) routing table, also called a route information base (RIB), 30 and a condensed next hop table, ARP cache 32, as well as optionally a routing cache. The programming algorithms used to maintain this routing cache pertains to an embodiment of this invention. The purpose of the routing cache is to provide high performance routing for packets that can be routed using the cache. The routing table holds routes to accessible subnets and routes to directly accessible hosts. Each route in the routing table 30 indexes one or more next hop addresses in the next hop table 32.

In addition, a router 28 may include a routing cache 34. The routing cache 34 has a limited number of entries. In a host route cache, the cache holds the host IP address and corresponding forwarding information to use when routing a packet to that address. A disadvantage with a host route cache is storing the host routes takes a substantially large amount of memory and takes a lot of CPU power to program if the router is routing to a large number of hosts. Another alternative that has been used has been to use very large network route tables in the high speed forwarding logic of hardware routers, these high speed routers program all of the active routes known to the router into a forwarding table for the hardware routing stack. It is very expensive to build hardware routers with these large forwarding tables. To reduce the required memory, research and development efforts exist that focus on compressing the database of active host routes to fit into smaller network route caches. (This research doesn't apply to host route cache mechanisms. This research applies to compressing large routing tables so that they can fit into smaller CAMs. Typically, these CAMs still need to be ~100,000 entries while the CAM we are targeting is around ~4,000.) Nevertheless, even with such compression, incorporating a network route table in the hardware forwarding path that stores the complete set of active routes known to the router is expensive.

One embodiment of the present invention pertains to an improved routing cache 34. Instead of storing host routes as discussed above, the improved routing cache 34 stores route fragments. A route fragment is a route that is a subset of a route that is present in the BMP routing table 30. A route fragment may contain as many hosts as the route it is generated from, or it may contain fewer hosts than the route it is generated from. What distinguishes a route fragment from a route is that a route fragment may contain fewer hosts than the route it was generated from. Such a routing cache 34 may be referred to as a route fragment cache. While a host route is limited to one IP address, a route fragment may advantageously span a set of IP addresses. Hence, storing route fragments provides a basis for a more compact and economical routing cache 34.

Route fragments may be thought of as covering address regions falling on a power of two boundary in the IP address space. For example, if the fragment width is 32 bits under 32-bit IP (IP version 4 or IPv4), then the route fragment spans only a single IP address (like a host route). If the width is 31 bits, then the route fragment spans two (2) IP addresses (i.e. the $32^{nd}$ bit is masked). If the width is 30 bits, then the route fragment spans four (4) IP addresses (i.e. the $31^{st}$ and $32^{nd}$ bits are masked). If the width is 29 bits, then the route fragment spans eight (8) IP addresses (i.e. the $30^{th}$, $31^{st}$, and $32^{nd}$ bit are masked). And so on. The preceding description applies to routes in the RIB, and subnets, as well as route fragments.

Figure 2:
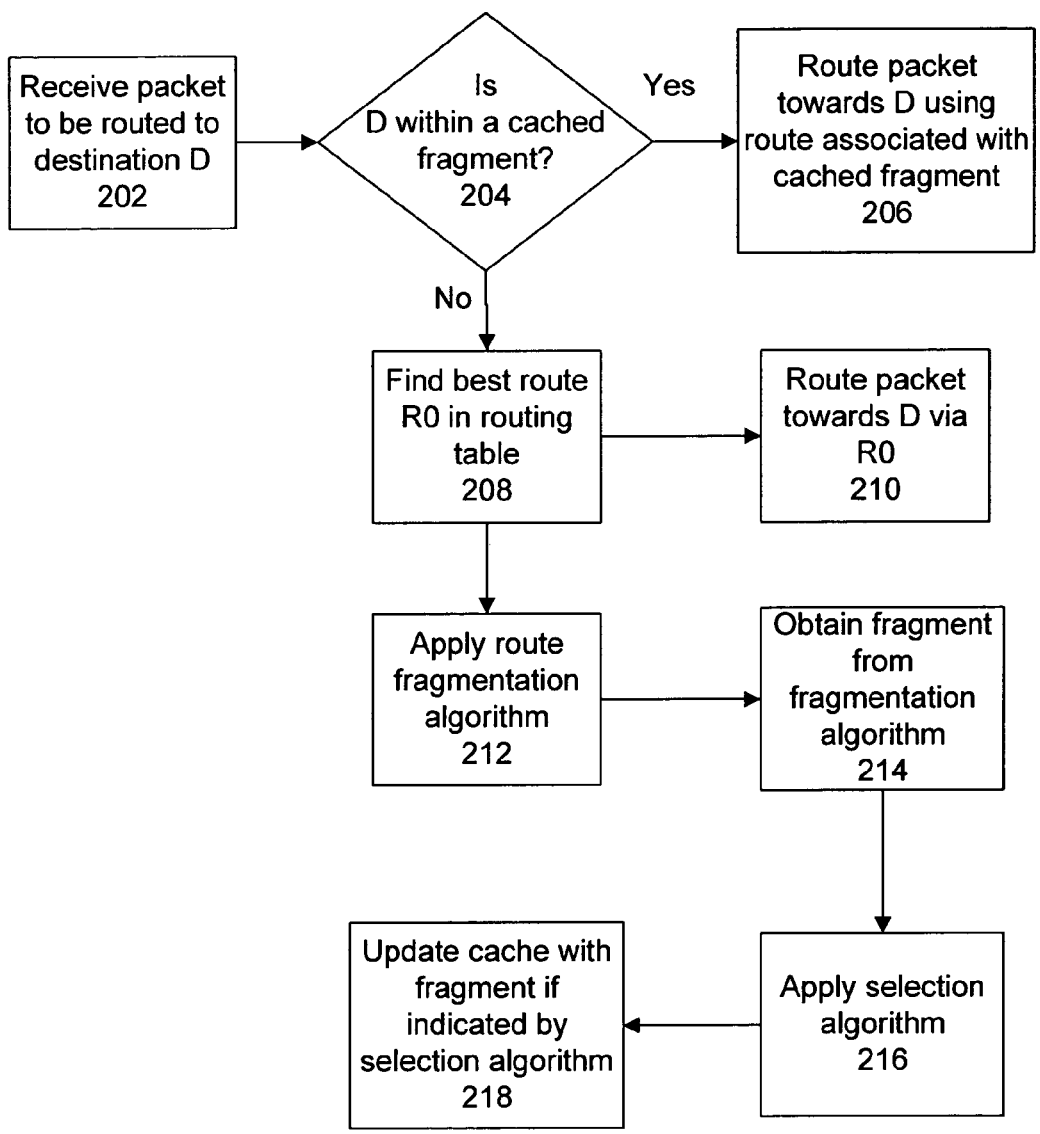
FIG. 2 is a flow chart depicting a method of using a route fragment cache in accordance with an embodiment of the invention.

Another embodiment of the invention pertains to a method of using a route fragment cache. FIG. 2 is a flow chart depicting one such method.

In FIG. 2, a router receives 202 a packet to be routed to destination address "D". A determination 204 is then made as to whether the destination D is covered by one of the route fragments in the route fragment cache. If the destination D is within a cached fragment, then the route associated with that fragment is used to route 206 the packet towards the destination D.

On the other hand, if the destination D is not within any fragment in the cache, then the routing table is consulted to find 208 the "best" route "R0" therein to the destination D. That route R0 is then used to route 210 the packet towards the destination D. In addition, the route fragmentation algorithm is applied 212, and a route fragment is obtained 214 therefrom. One embodiment of a route fragmentation algorithm is described below in relation to FIG. 3.

The route fragment obtained 214 may or may not be programmed into the route fragment cache in response to the packet that could have been forwarded using the fragment. Whether or not the route fragment is included in the cache, and which fragment it would replace (if any), is determined by applying 216 a selection algorithm. Various selection algorithms may be used. For example, a simple selection algorithm may always replace a least recently used fragment with the newly calculated fragment. The selection algorithm may be more complex and depend on, among other factors, the size of the cached and newly calculated fragments, the frequency of use of the cached fragments, and the breadth of use (number of distinct destinations being routed to) of the fragments in the cache. If the selection algorithm determines that the newly calculated fragment should be stored in the route fragment cache, then the cache is updated 218 accordingly.

Figure 3:
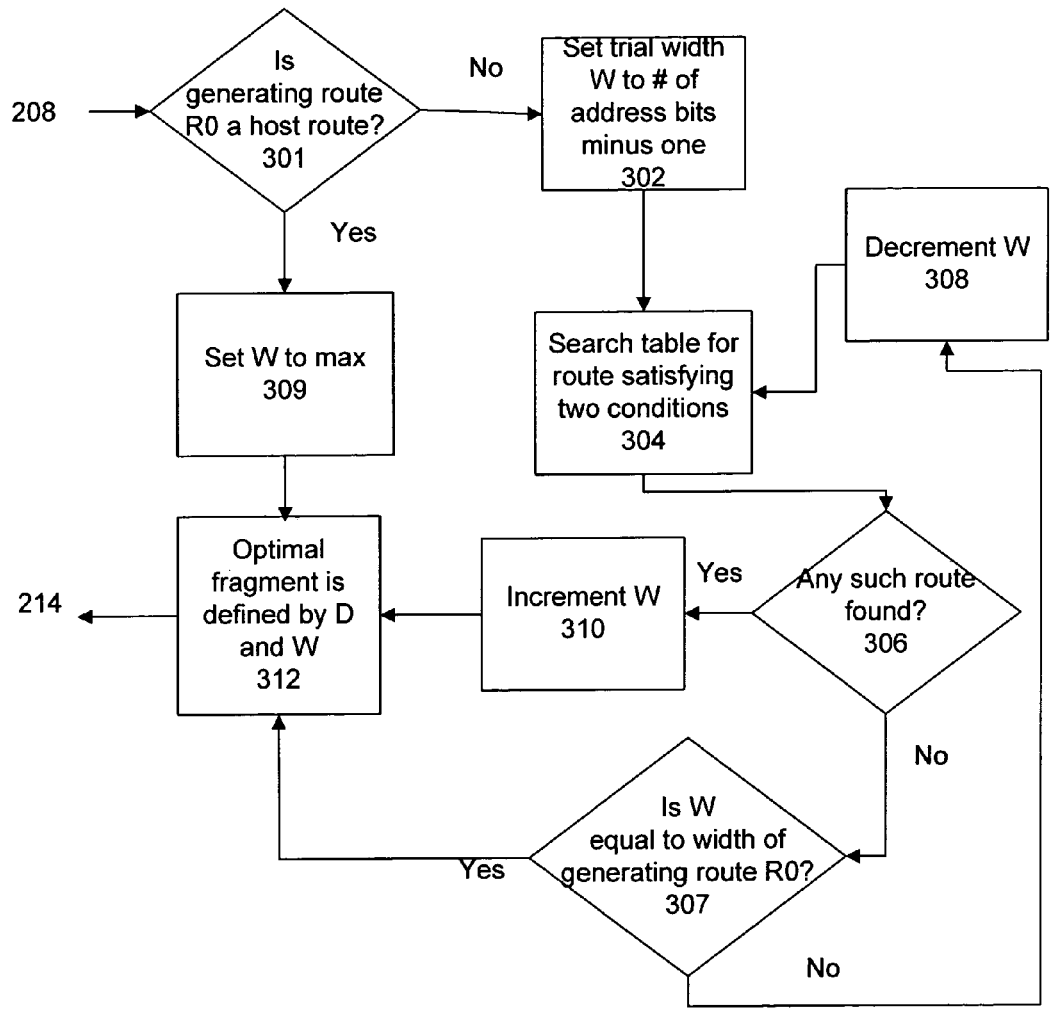
FIG. 3 is a flow chart depicting one algorithm for calculating a route fragment that may be stored in a route fragment cache in accordance with an embodiment of the invention.

Another embodiment of the invention pertains to the algorithm for calculating a route fragment that may be stored in a network route or route fragment cache. FIG. 3 is a flow chart depicting one such algorithm. The particular algorithm depicted in FIG. 3 determines an "optimal" route fragment. An "optimal" route fragment, as defined herein, is a route fragment that is the largest route fragment that routes to a target address and does not intersect any routes that are more specific than the route from which the fragment is derived. Alternative algorithms may also be used to determine an optimal route fragment.

A route fragment cache may be programmed using either optimal or non-optimal route fragments. A "non-optimal" route fragment is a route fragment that routes to a target address and does not intersect any routes in the RIB that are more specific than the route from which the fragment is derived but is not necessarily the largest such route fragment.

A simplified example will be used to facilitate the explanation of FIG. 3. Table 1 below is an example routing table. The routes in Table 1 use eight (8) bit addresses for reasons of simplification. IPv4 uses thirty-two (32) bit addresses. IPv6 uses one-hundred-twenty-eight (128) bit addresses. With such larger addresses, the process will be similar.

TABLE 1

| RouteID | Route.Network Address | Route.Mask | Forwarding Information |
|---|---|---|---|
| 0 | 00000000b | 00000000b | FA |
| 1 | 10000000b | 10000000b | FB |
| 2 | 00010000b | 11110000b | FA |
| 3 | 10100000b | 11110000b | FC |
| 4 | 01001000b | 11111100b | FC |
| 5 | 01001100b | 11111100b | FD |
| 6 | 10001000b | 11111100b | FD |
| 7 | 11111111b | 11111111b | FE |

Packets are routed using the route in the routing table that best matches their destination address. A destination address matches a route if the following statement is true: (Route.NetworkAddress & Route.Mask)==(Destination.NetworkAddress & Route.Mask). In other words, the non-masked address bits (those bits that are 1, instead of 0) of the route address and the destination address must match. The most specific route in the routing table that matches the destination address is the one that is used. The route that is the most specific (and therefore best matching) route is the route with the most ones (1s) in its route mask.

For instance, in our 8-bit example, the route "R0" that would be used to route to the destination "D" of 10001001b is route 6. This is because route 6 is the most specific route that matches the destination 10001001b. There are three routes that match the destination 10001001b, they are 0, 1 and 6. These routes match this destination because the statement (Route.NetworkAddress & Route.Mask)==(IP & Route.mask) is true for all three of these routes, as shown by the following. For Route0: (00000000b & 00000000b)==(10001001b & 00000000b)==00000000b. For Route1: (10000000b & 10000000b)==(100001001b & 10000000b)==10000000b. For Route6: (10001000b & 11111100b)==(100001001b & 11111100b)==10001000b.

The algorithm depicted in FIG. 3 is typically applied 212 after the best route "R0" to destination address "D" is found 208 in the routing table. In a first step, a determination 301 is made as to whether the generating route R0 is a host route. If yes, then the trial width W is set 309 to a maximum (the number of address bits), and the optimal fragment is defined by D and W. If no, then a trial subnet mask width "W" for the fragment is set to the maximum number of bits minus one. For IPv4, the trial width W would be set to thirty-one (31) bits. In our simplified example, the trial width W would be set to seven (7) bits.

The route fragment is defined by the destination D and the trial width W. D is used as the network address for the route fragment. The routing table is then searched 304 for routes that satisfies the following two conditions:

i) it is more specific than the route that the fragment is being generated from; and ii) it intersects fragment defined by D and W.

Here, two routes are considered to "intersect" if one of the two routes is a subset of the other (using the earlier definition of subset). Note that two routes that are equivalent are subsets of each other.

A determination 306 is then made as to whether any such route was found. If there is such a route satisfying the two conditions, then that means that the route fragment generated for D must be constrained by the routes that intersect it. Hence, the latest trial width W is incremented 310 by one bit. This is to avoid the constraining routes. The optimal route fragment is then defined 312 by destination address D and mask width W. This route fragment may then be programmed into the cache if so determined by a selection algorithm.

Otherwise, if no such route was found (in conditional step 306), then a determination 307 is made as to whether W is equal to the width of the generating route R0. If yes, then the optimal route fragment is then defined 312 by destination address D and mask width W. If no, then W is decremented 308 and the process 212 loops back to searching 304 the routing table for routes that match the above-described two conditions.

Note that the trial width W should not go negative, and further the trial width W should not become less than the width of the best route R0. Once the trial width W becomes equal to the width of the best route R0, then the conclusion is that there is no other route from the routing table that constrains the fragment size. Hence, in that case, the route fragment's width is the same as the width of the best route R0.

The fragmentation algorithm discussed above in relation to FIG. 3 is a relatively simple route fragmentation algorithm. Other, more efficient, algorithms for fragment generation may be built around routing trees that sort the routes such that the routes in the tree are ordered first by width (least specific first) and then by network address. The algorithm of FIG. 3, however, is sufficient to define the meaning of an optimal route fragment.

Illustrative Example of Cache Population and Maintenance Using Route Fragmentation The following discussion describes the population and management of a network route or route fragment cache using an illustrative series of events. For purposes of this discussion, we use our 8-bit example routing table, and we assume a routing cache that includes space for only two route fragments.

First, consider that the router has an empty cache and receives a packet destined for address 00000010b. The best route R0 from the table for this destination is route 0 with network address 00000000b, mask 00000000b, and next hop FA. Using the fragmentation algorithm, the route fragment obtained has network address 00000000b and width of 4 bits (equivalent to mask 11110000b). The fragment size was constrained by route 0 and route 2 from the routing table. In this instance, with the cache currently empty, the route selection metric decides to program this fragment into the routing cache. Hence, the routing cache now has the following entries:

| Entry # | Network Address | Width | Next Hop |
|---|---|---|---|
| 0 | 00000000b | 4 | FA |
| 1 | | | |

Next, a packet destined for 10010001b is received by the router. This destination is not covered by the route fragment currently cached. The best route R0 from the table for this destination is route 1 with network address 10000000b, mask 10000000b, and next hop FB. Using the fragmentation algorithm, the route fragment obtained has network address 10010000b and width of 4 bits (equivalent to mask 11110000b). The fragment size was constrained by route 1 and route 6 from the routing table. In this instance, with an empty slot in the cache, the route selection algorithm decides to program this fragment into the routing cache. Hence, the routing cache is now fully populated with the following entries:

| Entry # | Network Address | Width | Next Hop |
|---|---|---|---|
| 0 | 00000000b | 4 | FA |
| 1 | 10010000b | 4 | FB |

Next, a packet destined for 11111110b is received by the router. There are no route fragments cached that contain this destination. The best route R0 from the table for this destination is route 1 with network address 10000000b, mask 10000000b, and next hop FB. Using the fragmentation algorithm, the route fragment obtained has network address 11111110b and width of 8 bits (equivalent to mask 11111111b). The fragment size was constrained by route 1 and route 7 from the routing table. In this instance, the route selection algorithm decides not to program this fragment into the routing cache. In other words, the selection algorithm decides that the route fragments already in the cache are more valuable than this new route fragment. Hence, the existing routes are left in the cache, and the routing cache is unchanged from the previous event.

Next, a packet destined for 10011010b is received by the router. This destination is contained by entry #1 in the route fragment cache, so the packet is routed using the forwarding information FB. Since the cache was used, no best match prefix search is necessary, saving processing time.

Next, a packet destined for 00000111b is received by the router. This destination is contained in entry #0 in the route fragment cache, so the packet is routed to using the forwarding information FA. Since the cache was used, no best match prefix search is necessary, again saving processing time.

Lastly, consider that a packet destined for 01001001b is received by the router. This destination is not contained in any fragments that are currently in the cache. The best route R0 from the table for this destination is route 4 with network address 01001000b, mask 11111100b, and with forwarding information FC. Using the fragmentation algorithm, the route fragment obtained has network address 01001000b and width of 6 bits (equivalent to mask 11111100b). The fragment size was not constrained by any routes other than route 4. In this instance, the route selection algorithm determines that this route fragment is more valuable than the route fragment already in the cache as entry #1. So this less valuable route fragment, entry #1, is removed from the cache, and the new fragment is programmed in its place. The routing cache now has the following contents.

| Entry # | Network Address | Width | Next Hop |
|---|---|---|---|
| 0 | 00000000b | 4 | FA |
| 1 | 01001000b | 6 | FC |

And so on for subsequent events.

Sub-Optimal Route Fragments

In accordance with other embodiments of the present invention, variations may be made upon the optimal fragmentation algorithms discussed herein to generate sub-optimal route fragments. A routing cache utilizing sub-optimal route fragments may, in some instances, closely match the performance characteristics of a cache using optimal route fragments. A sub-optimal route fragment is defined herein to be any network route that is programmed into a route cache, where the network route is smaller (i.e. has a larger width value) than the route in the RIB that the fragment is a derivative of. Here, the RIB (routing information base) is defined as a database of all active routes in the system. (This definition is distinct from the normal definition of an RIB.) In other words, if a route, Rm, that is in a routing cache is more specific than the route from the RIB that should be used to route to the set of hosts specified by Rm then this route is a route fragment. Two routes with address/mask Rnet1/Rmask1 and Rnet2/Rmask2 are equivalent when ((Rnet1 & Rmask1)==(Rnet2 & Rmask2)) && (Rmask1==Rmask2).

Fixed Width Fragments

In accordance with other embodiments of the present invention, fixed width fragments (instead of optimal width fragments) may be utilized in a routing cache. This technique may be implemented, for example, by using a table that represents route fragments of a particular width, and by breaking down the routes in the routing table down into fragments of these fixed widths. This fixed width technique may be considered as an improvement on the technique of caching routes to individual hosts in a host route cache.

Finding Min/Max Bounds

Given a destination for which you wish to find an optimal route fragment, it is useful to know the addresses that will bound the beginning and the end of the optimal route fragment that will be used to encompass the selected destination. The beginning bound will be the larger one of two values:
1.) the first address in the route that is being fragmented, or
2.) the largest address, if there are any such addresses (this value will be 0 if there are no such addresses), that is
   a) the address after the last address of a route that is more specific than the route being fragmented, and
   b) that is lower in the IP address space then the destination address.

The ending bound will be the smaller one of two values:
1.) the last address in the subnet for the route being fragmented, or
2.) it will be the smallest address, if there are any such addresses (this value will be infinity if there are no such addresses), that is
   a) the address before the first address of a route that is more specific than the route being fragmented, and
   b) that is higher in the IP address space then the destination address.

Using Min/Max Bounds to Generate a Route Fragment:

Given the min/max bounds for the route fragment generated using the above method, an optimal route fragment can be generated rapidly. This is done by starting with a route fragment of width 32 and expanding the fragment until it extends outside one of the two bounds. The fragment that has a width one bit less than the first fragment that extends outside of the bounds is the optimal fragment. This is a linear search complexity operation that can be optimized to use a binary search. In a binary search you would begin with a width of 16 and observe if the fragment is too small or too big. If it is too small, then you will subtract $16/2^N$ from the current width. If it is too small, then you will add $16/2^N$ to the current width. For this operation, in this example, let it be assumed that N will never be allowed to go over 4; it will keep iterating until an acceptable fragment is found but N will never go over 4. This binary search will stop when the current width defines a fragment that does not go outside of the bounds, and the fragment that has a width value that is one larger than the current fragment width is not an acceptable fragment (it is out of bounds). Using this binary search algorithm, it will take logBase2(Bits)+1 or fewer iterations to find an optimal fragment where Bits is the number of bits in the addresses being used (32 for IPv4 128 for IPv6.) The maximum number of iterations necessary to generate an optimal route fragment using the linear search mechanism is Bits iterations. There are other search strategies that may be used to generate an optimal route fragment given the bounds for the fragment. These include radix searches other than a binary search.

Route Fragmentation Using a Hash

In accordance with other embodiments of the present invention, route fragmentation can also be used to expand the usefulness of a host route hash FIB (forwarding information base, this is a set of routes to accessible destinations). (Note, use of the term "FIB" herein is probably distinct from the industry standard one. As we are using the term, the FIB is not necessarily capable of routing to all destinations known to the complete set of active routes in the RIB.) For example, consider a system with a hash based host route cache. The routing capacity of that hash based host route cache may be expanded, and the reliance on the network route cache reduced (if one is present) by embedding into the hash lookups the ability to widen the number of hosts any host route entry can match on. This can be done by doing two things: 1) Adjusting the hash function so that it masks out a configurable number of bits, X, from the least significant portion of the host route destination address before computing a hash value for a packet. 2) Adding a field to the output of each hash entry that identifies the number of bits, Y, that should be masked out of the destination search address before attempting to compare the destination search address with the destination address specified as the host route destination match criteria. Using such a mechanism, many of the smaller route fragments that may be generated can be programmed into the less expensive host route cache, rather than expending space in the much more expensive network route cache to store these small fragments. With this modification the host route cache is no longer really a host route cache; it is now a network route cache that is capable of representing route fragments with a range of widths.

Hardware Configurations

Embodiments of the present invention may be implemented using various hardware configurations to perform forwarding using variable width (or fixed width) network routes. For example, a content addressable memory (CAM) may be used to search for network route matches. Alternatively, searching for network route matches may be implemented with a route tree in hardware, or even a linear search. There are various mechanisms for implementing variable width network route caches. In accordance with an embodiment of the invention, a subset of a full RIB is stored in a cache that has entries for which any one entry can match a variable number of destinations. Also, route fragmentation in accordance with an embodiment of the invention, does not require a network route cache to support a best match prefix capability. This is because the route fragments do not intersect each other, so the best match prefix capability is not necessary.

Example Source Code Used for Simulations

Example source code used for simulations of the technique is given below. The source code is separated into three files RouteFragSim.h, LinearRouteTable.cpp, and RouteFragSim.cpp. LinearRouteTable.cpp includes a couple of route fragmentation algorithms in accordance with embodiments of the present invention. Algorithm B in the code relates to the method of FIG. 3. Algorithm A relates to an alternate method of calculating optimal route fragments. RouteFragSim.cpp contains code that empirically shows that the route fragmentation algorithms generate optimal fragments.

---

RouteFragSim.h

```
Typedef unsigned int IP_ADDRESS;
#define MAX_ROUTE_TABLE_SIZE (8 * 1024)
#define MIN_IP              0x00000000
#define MAX_IP              0xFFFFFFFF
class LinearRoute Table
{
public:
    LinearRouteTable( );
    bool InsertRoute(IP_ADDRESS netAddress, IP_ADDRESS
    mask);
    bool GetFragment(IP_ADDRESS target, IP_ADDRESS
    *fragNetAddress, IP_ADDRESS *fragMask);
    bool FindRoute(IP_ADDRESS netAddress, IP_ADDRESS mask);
    bool FindRouteTo(IP_ADDRESS target, IP_ADDRESS
    *netAddress, IP_ADDRESS *mask);
    bool ValidateFragment(IP_ADDRESS fragNetAddress,
    IP_ADDRESS fragMask);
    bool ValidateFragmentIsGeneral(IP_ADDRESS fragNetAddress,
    IP_ADDRESS fragMask);
    bool ValidateFragmentIsNotSuperset(IP_ADDRESS
    fragNetAddress, IP_ADDRESS fragMask);
```

```
private:
    int routeCount;
    IP_ADDRESS *maskArray;
    IP_ADDRESS *netAddrArray;
};
/* Simulation Parameters. */
#define SIM_TABLE_COUNT       (64)
#define SIM_ROUTE_COUNT (4 * 1024)
#define SIM_PKT_COUNT   (16 * 1024)
LinearRouteTable.cpp include "RouteFragSim.h"
include "stdio.h"
#include "assert.h"
LinearRouteTable::LinearRouteTable( )
{
    routeCount = 0;
    maskArray = new IP_ADDRESS[MAX_ROUTE_TABLE_
        SIZE];
    netAddrArray = new IP_ADDRESS[MAX_ROUTE_TABLE_
        SIZE];
}
/* Returns true if the route was added, otherwise it returns
false.
 * If the route is already present it returns false. */
bool LinearRouteTable::InsertRoute(IP_ADDRESS netAddress,
IP_ADDRESS mask)
{
    netAddress = netAddress & mask;
    if(FindRoute(netAddress, mask))
        return false;
    if(routeCount >= MAX_ROUTE_TABLE_SIZE)
        return false;
    netAddrArray[routeCount] = netAddress & mask;
    maskArray[routeCount] = mask;
    routeCount++;
    return true;
}
/* Determine if a particular route is present. */
bool LinearRouteTable::FindRoute(IP_ADDRESS netAddress,
IP_ADDRESS mask)
{
    int i;
    netAddress = netAddress & mask;
    for(i = 0; i < routeCount; i++)
    {
        if((netAddress = = netAddrArray[i]) && (mask = =
            askArray[i]))
                return true;
    }
    return false;
}
/* Find the most specific route to a particular destination.
*/
bool LinearRouteTable::FindRouteTo(IP_ADDRESS target,
IP_ADDRESS *netAddress, IP_ADDRESS *mask)
{
    int i;
    bool found = false;
    /* Find the most specific route to the destination. */
    for(i = 0; i < routeCount; i++)
    {
        /* Check to see if the route matches. */
        if((target & maskArray[i]) = = netAddrArray[i])
        {
            /* If another route to this destination was found
             * determine if this new one is more specific, if
             * it's not keep the route that was found earlier. */
            if(found = = true)
            {
                if(*mask < maskArray[i])
                {
                    *netAddress = netAddrArray[i];
                    *mask = maskArray[i];
                }
            } else
            {
                *netAddress = netAddrArray[i];
                *mask = maskArray[i];
            }
            found = true;
        }
    }
    return found;
}
/* Find the "best" route fragment that can be used to route to
target. */
/* The "best" route fragment is a route fragment that
 * 1.) Is the most general route fragment possible.
 * 2.) Is a fragment that does not contain any routes that
 *     don't have a one-to-one relationship with the fragment.
 */
bool LinearRouteTable::GetFragment(IP_ADDRESS target,
IP_ADDRESS *fragNetAddress, IP_ADDRESS
*fragMask)
{
    IP_ADDRESS routeToIpAddr, routeToMask;
    IP_ADDRESS ipRangeMin, ipRangeMax;
    IP_ADDRESS lowBound, hiBound;
    IP_ADDRESS fragmentMask;
    int i;
    /* ipRangeMin is the biggest route boundry that is
     * smaller than target. */
    /* ipRangeMax is the smallest route boundry that is
     * bigger than the target. */
    /* Begin by finding the route to the target. */
    if(FindRouteTo(target, &routeToIpAddr, &routeToMask) = = 0)
    return false;
    /* The mask of the route that is used to route to the
    address is the most
     * general the fragment can be. The route fragment for
    routing to target
     * must be as specific or more specific than the route that
    is used to route
     * to target. */
    /* NOTE: The mechanism for finding ipRangeMin and
    ipRangeMax will
     * vary depending upon the data structure used to store
    the routing table
     * this is one possible algorithm based upon this route
    table data
     * structure. */
    ipRangeMin = routeToIpAddr;
    ipRangeMax = routeToIpAddr | ~routeToMask;
    for(i = 0; i < routeCount; i++)
    {
        /* The route that was found must be the most specific
    route to this
         * target, so any other route must be more specific than
    the route
         * found in order for them to affect the fragment. */
        if(maskArray[i] <= routeToMask)
            continue;
        lowBound = netAddrArray[i] & maskArray[i];
        hiBound = netAddrArray[i] | ~maskArray[i];
        /* The route at i should not be a route to target,
         * so hiBound should not equal target since hiBound
         * is part of a route that is more specific than the route
         * that was found to route to target. */
        assert(hiBound != target);
        /* Check to see if the high bound makes a new
    ipRangeMin */
        if((hiBound < target) && ((hiBound + 1) > ipRangeMin))
            ipRangeMin = hiBound + 1;
        /* The route found should not be a route to target,
         * so lowBound should not equal target since lowBound
         * is part of a route that is more specific than the
         * route that was found to route to target. */
        assert(lowBound != target);
        /* Check to see if the low bound makes a new
    ipRangeMax */
        if((lowBound > target) && ((lowBound - 1) < ipRangeMax))
            ipRangeMax = lowBound - 1;
    }
    /* Find largest fragment between ipRangeMin and
    ipRangeMax that
     * contains target. */
```

```
        /* ipRangeMax and ipRangeMin now hold the route fragment
        boundry. */
        /* BEGIN, ALGORITHM A */
        /* NOTE: This is one algorithm for optimal route
        fragmentation. */
        fragmentMask = MAX_IP;
        while((target & fragmentMask) >= ipRangeMin &&
        (target | ~fragmentMask) <= ipRangeMax)
        {
            fragmentMask = fragmentMask << 1;
        }
        fragmentMask = 0x80000000 | (fragmentMask >> 1);
        /* END, ALGORITHM A */
        *fragNetAddress = target & fragmentMask;
        *fragMask = fragmentMask;
        /* A fragment was found successfully. */
        return true;
}
/* Validate that a route fragment is the best possible route
fragment.
 * The "best" route fragment is a route fragment that
 * 1.) Is the most general route fragment possible.
 * 2.) Is a fragment that does not contain any routes that
 *     don't have a one-to-one relationship with the fragment.
 */
bool LinearRouteTable::ValidateFragment(IP_ADDRESS
fragNetAddress, IP_ADDRESS fragMask)
{
    if(ValidateFragmentIsNotSuperset(fragNetAddress, fragMask) = =
    false)
    {
        printf("Error: Fragment 0x%08x/0x%08x contains a non
        one-to-one subset route.\n",
                fragNetAddress, fragMask);
        return false;
    }
    if(ValidateFragmentIsGeneral(fragNetAddress, fragMask) = =
    false)
    {
        printf("Error: Fragment 0x%08x/0x%08x is a sub-
        optimal fragment.\n",
                fragNetAddress, fragMask);
        return false;
    }
    return true;
}
/* Validate that the route fragment is the least specific possible
route fragment. */
bool LinearRouteTable::ValidateFragmentIsGeneral(IP_ADDRESS
fragNetAddress,
                                    IP_ADDRESS fragMask)
{
    /* BEGIN, ALGORITHM B */
    /* NOTE: This is the basis for an alternative to algorithm A.
     *       For algorithm B, the below line must be applied
     *       recursively starting with the most specific
     *       fragment until it finds the most general fragment
     *       that is a valid fragment. */
    /* Attempt to make fragMask less specific and validate it.*/
    fragMask = (fragMask << 1);
    if(ValidateFragmentIsNotSuperset(fragNetAddress & fragMask,
    fragMask) = = true)
        return false;
    /* END, ALGORITHM B */
    return true;
}
/* A valid route fragment should not be a superset of any route,
if a route
 * is one to one with the route fragment that is ok, but the
route fragment
 * should not be a superset of any other route. */
bool LinearRouteTable::ValidateFragmentIsNotSuperset(IP_
ADDRESS fragNetAddress, IP_ADDRESS fragMask)
{
    int i;
    /* Go through the route table and verify that there are no
    routes for which
     * this route fragment is a superset. */
    for(i = 0; i < routeCount; i++)
    {
        /* The smaller the mask the more general the route is.
         */
        /* A route with a mask that is smaller or equal to the
        route fragment mask
         * could not be a non 1 to 1 subset of the route
        fragment. */
        if(fragMask >= maskArray[i])
            continue;
        /* If this line of code is reached then maskArray[i]
        must specify a more
         * specific route than the route fragment, this could
        be a route that
         * is a non 1 to 1 subset of the route fragment,
        check to see if this route
         * is contained within the route fragment. */
        if((netAddrArray[i] & fragMask) = = fragNetAddress)
        {
            return false;
        }
    }
    return true;
}
RouteFragSim.cpp include "RouteFragSim.h"
include "stdio.h"
#include "assert.h"
#include "time.h"
#include "stdlib.h"
bool extremeRouteFragTester(LinearRouteTable *rtTable);
int routeWidthHistogram[33];
int fragmentWidthHistogram[33];
LinearRouteTable *generateRandomRouteTable( );
void analyzeRouteTable(LinearRouteTable *rtTable);
void printRouteTableRoutingStatistics( );
void main(void)
{
    int i;
    srand((unsigned)time(NULL));
    printf("Begining simulation...\n");
    for(i = 0; i < SIM_TABLE_COUNT; i++)
    {
        printf(".");
        rtTable = generateRandomRouteTable( );
        analyzeRouteTable(rtTable);
        delete(rtTable);
    }
    printf("\nSimulation Complete.\n");
    printRouteTableRoutingStatistics( );
}
IP_ADDRESS generateRandomIP( )
{
    return(((rand( ) % 256) << 24)|
            ((rand( ) % 256) << 16)|
            ((rand( ) % 256) << 8)|
            ((rand( ) % 256)));
}
int generateRandomWidth( )
{
    return(rand( ) % 32);
}
IP_ADDRESS widthToMask(int width)
{
    /* Width can be any one of 33 numbers,
     * these represent the states from no
     * 1's to 32 1's. */
    assert((width >= 0) && (width <= 32));
    if(width = = 0)
        return 0;
    /* Sign extend for width spaces. */
    return ((int) 0x80000000) >> (width − 1);
}
/* This function translates a contiguous mask
 * to a width. */
int maskToWidth(IP_ADDRESS mask)
{
    int i;
```

-continued

```
        if(mask = = 0)
            return 0;
        i = 32;
        while((mask & 0x1) = = 0)
        {
            mask = mask >> 1;
            i- -;
        }
        return i;
    }
    /* The purpose of this function is to generate a
     * route table that is full of randomly selected
     * routes. */
    LinearRouteTable *generateRandomRouteTable( )
    {
        IP_ADDRESS rtNetAddr, rtMask;
        LinearRouteTable *rtTable;
        int rtWidth;
        int i;
        rtTable = new LinearRouteTable( );
        for(i = 0; i < SIM_ROUTE_COUNT; i++)
        {
            /* Keep trying to add random routes
             * until you find a new route that
             * can be added. */
            do {
                /* Generate a random rtNetAddr. */
                rtNetAddr = generateRandomIP( );
                rtWidth = generateRandomWidth( );
                rtMask = widthToMask(rtWidth);
                rtNetAddr = rtNetAddr & rtMask;
            } while(rtTable->InsertRoute(rtNetAddr, rtMask) = =
        false);
            routeWidthHistogram[rtWidth]++;
        }
        return rtTable;
    }
    /* This function will observe the route fragments that
     * are selected to route to route to random destinations.
     * This function will observe that the route fragments
     * are "good" and that track width statistics about
     * the route fragments that are generated. */
    void analyzeRouteTable(LinearRouteTable *rtTable)
    {
        IP_ADDRESS rtFragNetAddr, rtFragNetMask;
        IP_ADDRESS target;
        int maskWidth;
        int i;
        /* Find the route fragments that can be used
         * to route to SIM_PKT_COUNT randomly selected
         * destinations. */
        for(i = 0; i < SIM_PKT_COUNT; i++)
        {
            /* Keep trying to find random destinations
             * to route to until you find a destination
             * that the routing table has a route for. */
            do {
                /* Generate a random rtNetAddr. */
                target = generateRandomIP( );
            } while(rtTable->FindRouteTo(target, &rtFragNetAddr,
        &rtFragNetMask) = = false);
                /* Get a route fragment to route to this target. */
                rtTable->GetFragment(target, &rtFragNetAddr,
                    &rtFragNetMask);
            /* Track statistics. */
            maskWidth = maskToWidth(rtFragNetMask);
            fragmentWidthHistogram[maskWidth]++;
            /* Validate the route fragment. */
            assert(rtTable->ValidateFragment(rtFragNetAddr,
                rtFragNetMask));
        }
    }
    /* Print out collected statistics. */
    void printRouteTableRoutingStatistics( )
    {
        int i;
        printf("Route Table Routing Statistics: \n");
        printf(" Route Table Width Histogram: \n");
        for(i = 0; i < 33; i++)
```

-continued

```
        {
            if(i % 8 = = 0)
                printf(" ");
            printf("%06d ", routeWidthHistogram[i]);
            if(i % 8 = = 7)
                printf("\n");
        }
        printf("\n");
        printf(" Route Fragment Width Histogram: \n");
        for(i = 0; i < 33; i++)
        {
            if(i % 8 = = 0)
                printf(" ");
            printf("%06d ", fragmentWidthHistogram[i]);
            if(i % 8 = = 7)
                printf("\n");
        }
        printf("\n");
    }
```
Example Output of Program Produced From Source Code Begining simulation...
..........................................................
Simulation Complete.
Route Table Routing Statistics:
 Route Table Width Histogram:
   000064 000128 000256 000512 001024 002032 003805 005979
   007786 009020 009881 010161 010348 010515 010412 010432
   010545 010749 010550 010636 010625 010633 010663 010646
   010624 010492 010634 010651 010607 010634 010500 010600
   000000
 Route Fragment Width Histogram:
   000000 000000 000000 000000 000000 000000 000000 000000
   000000 000670 034377 173149 277623 242852 154841 083749
   042618 020544 009728 004587 002152 000845 000448 000243
   000101 000008 000009 000011 000007 000010 000004 000000
   000000

Discussion of Results Generated by Source Code

In addition to presenting example algorithms for generating optimal route fragments from a list of routes, the source code provided empirical evidence to show that the route fragments generated by the algorithms are optimal. It does this by generating numerous route fragments and observing that those route fragments are the largest route fragments possible and that they do not intersect any more specific routes. In effect there are two distinct algorithms for generating route fragments that are checking each other by comparing results and observing that they are identical.

Figure 4:
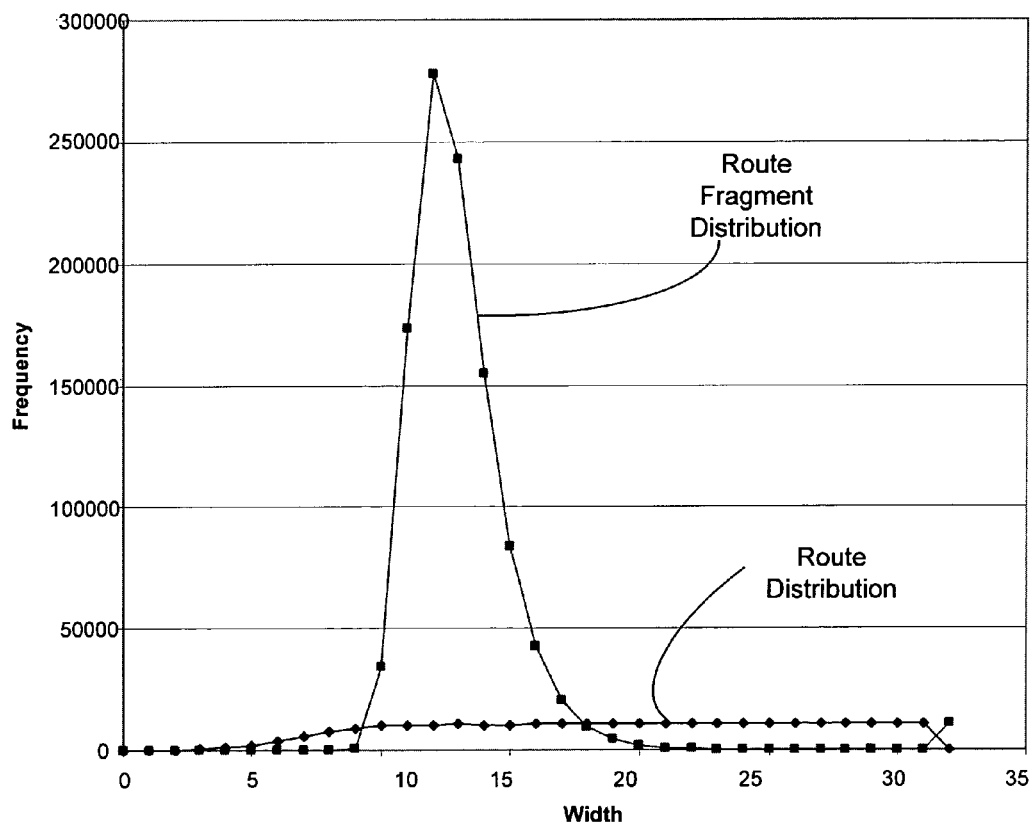
FIG. 4 shows the frequency of various route fragment widths as a result of simulations.

The graph of FIG. 4 shows the frequency of various route fragment widths as was simulated. The simulation included the simulated transmission of 1,048,576 packets to random reachable destinations using 64 distinct randomly generated routing tables each with 4096 distinct randomly selected routes. Across all the samples, it was observed that the average fragment width for all the fragments generated as a result of the routed packets was 13.1 bits. Two raised to the $13^{th}$ power is 8,192. Hence, this shows that, for at least this simulation, a typical route fragment that is generated is large enough to route to many more routes than using a host route cache (only 1 destination per host route cache entry as opposed to approximately 8,000 per route fragment entry in a network route cache.)

CONCLUSION

Many routers, including IPv4 routers, store overlapping routes in their routing table. When a packet needs to be routed to a particular host, the routing algorithm finds all the routes in the routing table that contain the destination host in their network, then the router takes the route that best matches the destination host address and routes the packet using this route. With IPv4 routing systems that don't use non-contiguous route masks, the "best" route is defined to be the route with the longest subnet mask. This "best-match" characteristic presents a problem for caching network routes in a cache that is not large enough to store the entire routing table. This is because the cache programming algorithm must have some way of identifying to the routing algorithm that uses the cache which regions of a particular cached route can be used and which should not be used because they overlap another more specific route. As a result of this best match characteristic there are many routes that will exist in the routing table that can't be programmed into the cache because those routes overlap more routes than will fit in the cache.

As discussed herein, route fragmentation is a technique for translating portions of a large set of routes in a BMP routing table into a smaller set of routes that can be effectively programmed into a network routing cache. In other words, route fragmentation is a mechanism for allowing a network routing cache to be used to route to locations that are only accessible through routes with many "contained" (i.e. overlapping, more specific) routes. When the cache programming algorithm wishes to program a particular route with a number of contained routes in order to route to a particular host or set of hosts, the cache programming algorithm determines a cacheable route fragment (a subset of the particular route that does not overlap more specific routes in the routing table) that may be stored in the cache. An "optimal" route fragment, as defined herein, is a route fragment that is the largest route that routes to a target address and does not intersect any routes that are more specific than the route from which the fragment was derived. A "non-optimal" route fragment is a route fragment that routes to a target address and does not intersect any routes that are more specific than the route from which the fragment was derived but is not necessarily the largest such route.

An embodiment of the present invention provides a mechanism for managing a network route cache that is not large enough to store all of the active routes in the RIB and that allows subsets of any route to be programmed therein. This enables a router capable of routing between very large sets of hosts to be implemented advantageously, for example, using a relatively low cost ASIC (application specific integrated circuit) that includes a relatively small network route cache and a relatively small host route cache. Hence, low-cost and high-performance routing may be thus achieved.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. An apparatus for routing packets towards destination addresses, the apparatus comprising:
   A computer-readable medium configured to store instructions and data;
   A routing table encoded onto the computer-readable medium, each route therein including a network address and a mask;
   A next hop table encoded onto the computer-readable medium with a next hop value corresponding to each route in the routing table;
   A route fragment cache encoded onto the computer-readable medium, the route fragment cache comprising a hash-based routing cache which is separate and distinct from the next hop table, each route fragment therein comprising a subset of a route from the routing table and corresponding forwarding information,
   Wherein the computer-readable medium is further encoded such that no rout fragment in the route fragment cache intersects any route in the routing table that is more specific than a preceding route fragment which was used to derive the route fragment,
   Wherein the computer-readable medium is further encoded such that a hash function for the hash-based routing cache masks out a configurable number of bits from a least significant section of the destination address for allowing individual hash entries to match on more than one destination address, and
   Wherein one or more fixed width route fragment caches are utilized.

2. The apparatus of claim 1, wherein each route fragment in the route fragment cache comprises an optimal route fragment.

3. The apparatus of claim 2, wherein a route fragment is optimal if there is no larger route fragment to a particular network address that does not intersect a(ny) route(s) that is(are) more specific than the route from which the fragment is generated in the routing table.

4. The apparatus of claim 1, wherein the route fragment cache includes non-optimal route fragments.

5. An apparatus for routing packets towards destination addresses, the apparatus comprising:
   A computer-readable medium configured to store instructions and data;
   A routing table encoded onto the computer-readable medium, each route therein including a network address and a mask;
   A next hop table encoded onto the computer-readable medium with a next hop value corresponding to each route in the routing table;
   A route fragment cache encoded onto the computer-readable medium, the route fragment cache comprising a hash-based routing cache which is separate and distinct from the next hop table, each route fragment therein comprising a subset of a route from the routing table and corresponding forwarding information,
   Wherein the computer-readable medium is further encoded such that no rout fragment in the route fragment cache intersects any route in the routing table that is more specific than a preceding route fragment which was used to derive the route fragment,
   Wherein the computer-readable medium is further encoded such that an output field of each hash entry identifies a number of bits to be masked out of a destination address for determining if the forwarding information from the hash-entry should be used to forward the packet, and Wherein one or more fixed width route fragment caches are utilized.

6. A method of generating a route fragment of a generating a route to a network address and using a cache of route fragments to route packets, the method comprising determination of a contiguous section of the route that does not intersect any route that is more specific than the generating route in a routing table, Wherein a section is defined as a set of hosts that can be represented by an individual route, and further comprising storing the route fragment in the cache of route fragment which is separate and distinct from a next hop table associated with the routing table, wherein the routing cache is used to route a packet if the network address of the packet is within any route fragment in the cache, further wherein the routing and next hop tables are used to route the packet if the network address of the packet is not within any route fragment in the cache, further wherein when the packet is routed by finding a route in the routing table, then a route fragment is obtained by applying a fragmentation algorithm to the route, and after the route fragment is obtained the route fragment cache is updated with the route fragment if such an update in indicated by a selection algorithm, wherein the apparatus is configured such that, when a destination address of a packet is within a route fragment in the route fragment cache, then the packet is routed using a route associated with the route fragment in the route fragment cache without consulting the routing and next hop tables and wherein the apparatus is further configured such that, when the destination address of the packets is not within any route fragment in the route fragment cache, then the packet is routed by finding a route in the routing and next hop tables.

7. The method of claim 6, wherein the section determined comprises and optimal rout fragment in that the section determined comprises a largest such section.

8. The method of claim 7, wherein the determination of the optimal rout fragment, that can be used for forwarding to a particular destination comprises finding constraining upper and lower bounds and determining a largest rout fragment falling within theses bounds.

9. The apparatus of claim 1, wherein the apparatus is configured such that, when a destination address of a packet is within a route fragment in the route fragment cache, then the packet is routed using a route associated with the route fragment in the route fragment cache without consulting the routing and next hop tabled.

10. The apparatus of claim 9, wherein the apparatus is further configured such that, when the destination address of the packet is not within any route fragment in the route fragment cache, then the packet is routed by finding route in the routing and next hop tables.

11. An apparatus for routing packets towards destination addresses, the apparatus comprising:
    A computer-readable medium configured to store instructions and data;
    a routing table encoded onto the computer-readable medium, each route therein including a network address and a mask;
    a next hop table encoded onto the computer-readable medium with a next hop value corresponding to each route in the routing table;
    a route fragment cache encoded onto the computer-readable medium which is separate and distinct from the next hop table, each rout fragment therein comprising a subset of a route from the routing table and corresponding forwarding information,
    wherein the computer-readable medium is further encoded such that no route fragment in the route fragment cache intersects any route in the routing table that is more specific than a preceding route fragment which was used to derive the route fragment,
    wherein the computer-readable medium is further encoded such that, when the packet is routed by finding a route in the routing table, then a route fragment is obtained by applying a fragmentation algorithm to the route, and after the route fragment is obtained, the route fragment cache is updated with the route fragment if such an update is indicated by a selection algorithm,
    wherein the apparatus is configured such that when a destination address of a packet is within a route fragment in the route fragment cache, then the packet is routed using a route associated with the route fragment in the route fragment cache without consulting the routing and next hop tables, and
    wherein the apparatus is further configured such that, when the destination address of the packet is not within any route fragment in the route fragment cache then the packet is routed by finding a route in the routing and next hop tables.

* * * * *

UNITED STATES PATENT AND TRADEMARK OFFICE
CERTIFICATE OF CORRECTION

PATENT NO. : 7,487,255 B2
APPLICATION NO. : 10/641217
DATED : February 3, 2009
INVENTOR(S) : Michael T. Roeder et al.

It is certified that error appears in the above-identified patent and that said Letters Patent is hereby corrected as shown below:

In column 11, line 41, delete "askArray[i]))" and insert -- maskArray[i])) --, therefor.

In column 18, line 4, in Claim 1, delete "A" and insert -- a --, therefor.

In column 18, line 6, in Claim 1, delete "A" and insert -- a --, therefor.

In column 18, line 9, in Claim 1, delete "A" and insert -- a --, therefor.

In column 18, line 12, in Claim 1, delete "A" and insert -- a --, therefor.

In column 18, line 18, in Claim 1, delete "Wherein" and insert -- wherein --, therefor.

In column 18, line 19, in Claim 1, delete "rout" and insert -- route --, therefor.

In column 18, line 23, in Claim 1, delete "Wherein" and insert -- wherein --, therefor.

In column 18, line 29, in Claim 1, delete "Wherein" and insert -- wherein --, therefor.

In column 18, line 43, in Claim 5, delete "A" and insert -- a --, therefor.

In column 18, line 45, in Claim 5, delete "A" and insert -- a --, therefor.

In column 18, line 48, in Claim 5, delete "A" and insert -- a --, therefor.

In column 18, line 51, in Claim 5, delete "A" and insert -- a --, therefor.

In column 18, line 57, in Claim 5, delete "Wherein" and insert -- wherein --, therefor.

In column 18, line 58, in Claim 5, delete "rout" and insert -- route --, therefor.

In column 18, line 62, in Claim 5, delete "Wherein" and insert -- wherein --, therefor.

In column 18, line 65, in Claim 5, delete "address" and insert -- search address prior to comparison with the destination address --, therefor.

In column 18, line 66, in Claim 5, delete "hash-entry" and insert -- hash entry --, therefor.

In column 19, line 1, in Claim 5, delete "Wherein" and insert -- wherein --, therefor.

CERTIFICATE OF CORRECTION (continued)
U.S. Pat. No. 7,487,255 B2

In column 19, line 4, in Claim 6, delete "a" before "route".

In column 19, line 8, in Claim 6, delete "Wherein" and insert -- wherein --, therefor.

In column 19, line 11, in Claim 6, delete "fragment" and insert -- fragments --, therefor.

In column 19, line 20, in Claim 6, after "obtained" insert -- , --.

In column 19, line 22, in Claim 6, delete "in" and insert -- is --, therefor.

In column 19, line 33, in Claim 7, delete "and" and insert -- an --, therefor.

In column 19, line 33, in Claim 7, delete "rout" and insert -- route --, therefor.

In column 19, line 36, in Claim 8, delete "rout" and insert -- route --, therefor.

In column 19, line 37, in Claim 8, after "destination" insert -- , --.

In column 19, line 38, in Claim 8, delete "rout" and insert -- route --, therefor.

In column 19, line 39, in Claim 8, delete "theses" and insert -- these --, therefor.

In column 19, line 45, in Claim 9, delete "tabled." and insert -- tables. --, therefor.

In column 20, line 4, in Claim 10, after "finding" insert -- a --.

In column 20, line 8, in Claim 11, delete "A" and insert -- a --, therefor.

In column 20, line 18, in Claim 11, delete "rout" and insert -- route --, therefor.

Signed and Sealed this

Thirtieth Day of March, 2010

David J. Kappos
*Director of the United States Patent and Trademark Office*